United States Patent [19]

DeCandia et al.

[11] Patent Number: 4,739,188

[45] Date of Patent: Apr. 19, 1988

[54] STARTING CIRCUIT ENCLOSURE

[75] Inventors: Giovanni DeCandia, Germantown; Edward B. Bilson, Memphis, both of Tenn.

[73] Assignee: FL Industries, Inc., Livingston, N.J.

[21] Appl. No.: 877,489

[22] Filed: Jun. 23, 1986

[51] Int. Cl.[4] .......................... H02M 1/02; F21L 1/00

[52] U.S. Cl. .................................. 307/149; 307/147; 307/150; 307/157; 174/52 R; 174/65 R; 174/DIG. 2; 361/413

[58] Field of Search ............... 307/147, 149, 150, 157; 361/399, 331, 332, 400–413; 174/48, 50, 52 R, 65 R, 59, DIG. 2; 362/362, 365, 265, 368, 374, 375, 390, 431, 432; 339/122 R, 122 F, 157 R

[56] References Cited

U.S. PATENT DOCUMENTS

| | | | |
|---|---|---|---|
| 3,555,394 | 1/1971 | Bramer et al. | 307/157 |
| 3,736,471 | 5/1973 | Donze et al. | 361/415 |
| 3,858,090 | 12/1974 | Lehmann | 361/385 |
| 4,039,902 | 8/1977 | Lacan et al. | 361/394 X |
| 4,138,711 | 2/1979 | Bremenour et al. | 361/399 X |
| 4,384,316 | 5/1983 | Vos et al. | 362/431 X |
| 4,388,535 | 6/1983 | Wiktor et al. | 361/378 X |
| 4,432,038 | 2/1984 | Bell | 361/386 |
| 4,504,697 | 3/1985 | Chapin et al. | 174/52 R |
| 4,587,594 | 5/1986 | McPherson | 361/386 X |
| 4,598,962 | 7/1986 | Reitz et al. | 361/399 X |

*Primary Examiner*—William M. Shoop, Jr.
*Assistant Examiner*—Paul Ip
*Attorney, Agent, or Firm*—Elliot M. Olstein; Raymond J. Lillie

[57] ABSTRACT

The present invention relates to a starter circuit case assembly having a starter section and a cap assembly. The starter section includes a starter circuit mounted on a circuit board and is securely engaged by the cap assembly. The cap assembly is mounted to and electrically connected to the light fixture.

12 Claims, 2 Drawing Sheets

STARTING CIRCUIT ENCLOSURE

BACKGROUND OF THE INVENTION

1. Field Of The Invention

The present invention relates to outdoor lighting equipment. In particular, the present invention relates to a protective cover providing ease of installation and removability of a starting circuit for high voltage lighting equipment.

2. Brief Description Of The Background Art

Starting circuits for lamps have long been known in the art. Originally, starting circuits were mounted in an unprotected fashion in lamp fixtures. As a direct consequence of leaving the circuits exposed to the environment, particularly in the case of outdoor lamps such as used in street lighting, their service life and levels of required maintenance have proved unacceptable. Accordingly, starting circuits have since been enclosed in cases so as to preclude repair frequencies accelerated by environmental conditions.

Weather protected starting circuits for environmentally exposed lighting equipment are frequently provided by enclosing the circuit assembly in a suitable insulated case, and fastening the case to the framework of the lighting fixture. Terminals are provided in the case and extend between the electronics inside the case to the outside of the case. The unit is plugged into an appropriate female socket. When the circuit ultimately proves defective, the case, with its contents, is removed and replaced with another. The entire circuit and casing is thus discarded.

These "unitary" type enclosed circuits have several drawbacks. Once installed in a light fixture, tools and substantial effort may be required to remove the starter assembly from its socket. If installed for ease of removal, the starter assembly may not be capable of maintaining a secure, stable contact with the terminals in the fixture when the fixture is subject to wind movement. Replacing a defective circuit is also expensive since the cover and its contents are removed and not reused. Therefore, it is necessary to construct a starter circuit which is inexpensive to replace, while maintaining the reliability of the unit. It is also useful to provide a functionally reliable enclosed starting circuit that can be assembled by hand, that utilizes a cover that can be reused if desired and yet retains plug-in adaptability.

Several starting circuit structures and assemblies are currently available for use as a starter circuit for high-voltage outdoor lighting equipment. However, each of these structures and assemblies have their drawbacks. One type of currently used structure comprises a base circuit board fastened mechanically to the lighting fixture by one or two screws or similar fastening devices. A tool is required to install and to remove the board. Electrical connections are made by hand, with fast-on terminals. Such boards are not protected from the environment.

Another type of starting circuit structure presently available is similar to that described in the preceeding paragraph, except that the device is equiped with a "quick disconnect" apparatus wherein installation and subsequent removal of the board is accomplished without the aid of tools.

Still another currently available starter circuit structure comprises a case housing the starter electrical components, which components are potted with an epoxy mixture. The casing is then fastened to the lighting fixture housing with one or two screws. A tool is required to install and remove this device. Electrical connections are made by hand with fast-on terminals or wire nuts. These units, by their construction which includes a casing, protect the circuit board assembly from the environment.

A fourth type of currently available starter circuit structure comprises a unit as described in the immediately preceeding paragraph, only with a "quick disconnect" connection between board and fixture housing. Installation and removal of such devices can be accomplished without tools.

The latter two described units do not provide access to the electrical components, once potted, for inspection. Also, in case of failure, the complete starter unit must be replaced.

SUMMARY OF THE INVENTION

The present invention provides a starting circuit structure using a standard starter circuit board. However, the electrical components are environmentally protected and are also equipped with the "quick disconnect" feature which allows removal of the board without the necessity of tools. The board is captively contained inside a case, and the portion of the case housing the board can easily be removed, with the board, for inspection and replacement if necessary. The board can be easily retrofitted in the field.

It is, therefore, an object of the present invention to provide an environmentally isolated starting circuit for a light fixture.

It is another object of the present invention to provide a starting circuit case that allows for easy servicing and/or replacement of the enclosed starting circuit in its associated light fixture.

It is a further object of the present invention to provide a starting circuit case that allows rapid replacement of the starting circuit without the use of tools or the need to disconnect electrical leads from the circuit case.

These and other objects are provided by the starting circuit case combination of the present invention. The novel circuit case is provided by a two section assembly having a starter section and a cap section. The starter section includes the starting circuit board and its case and is releasably engaged by the cap section. The cap section, which is mounted to the light fixture, contains terminal leads extending to the fixture electronics. When the starter section is attached to the cap section, appropriate electrical connections are automatically made between the starter circuit and the terminal leads.

BRIEF DESCRIPTION OF THE DRAWINGS

To aid illustration and understanding of the invention, reference is made to the drawings wherein.

DETAILED DESCRIPTION OF THE INVENTION

Figure 1:
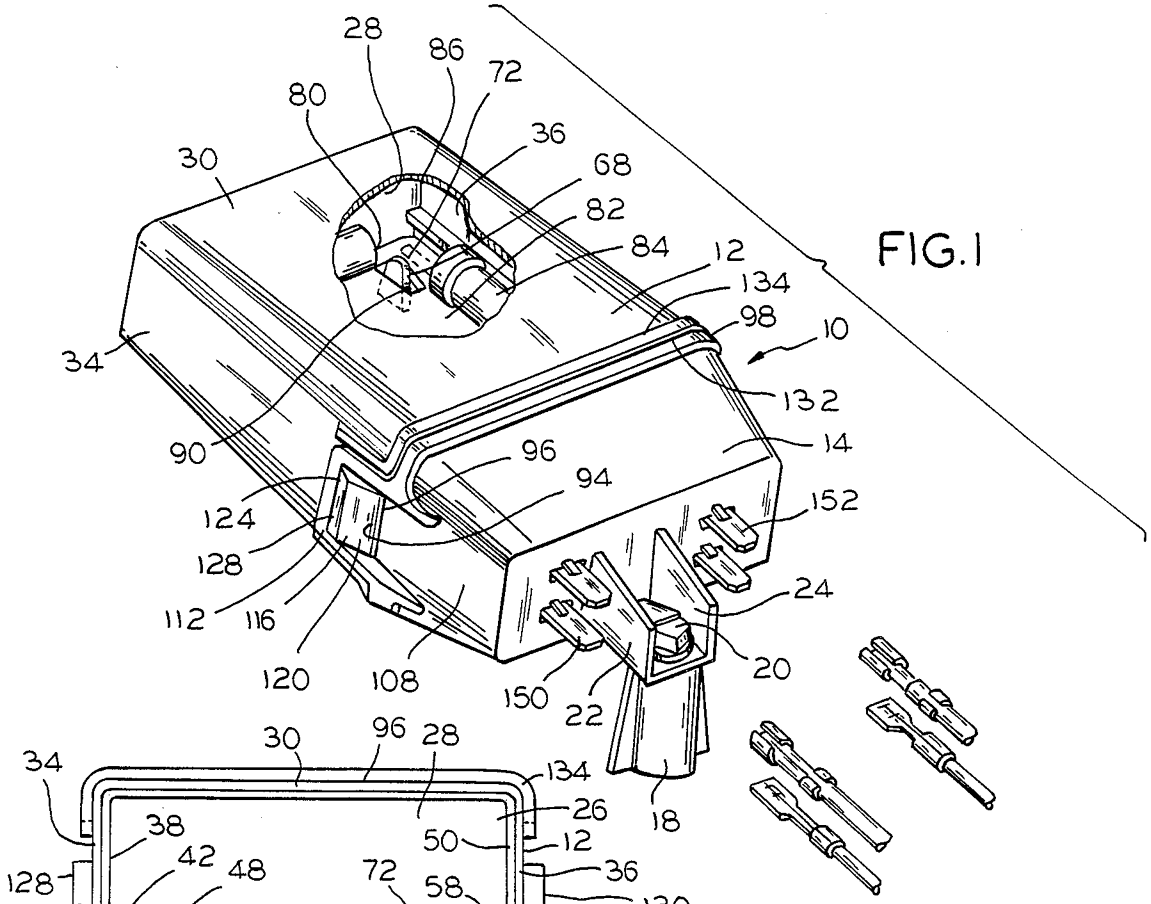
FIG. 1 is a partially cut-away perspective view of the starting circuit case of the present invention.

Referring to FIG. 1, the starting circuit case forming the present invention, generally designated 10, includes a starter section 12 and a cap assembly 14 removably attached to the starter section. Cap assembly 14 provides an integral mounting flange 16 extending therefrom by which the cap and circuit case 10 may be mounted to any suitable light fixture support 18. Cap assembly 14 may be mounted by any conventional retaining device, such as bolt 20 threaded into support 18. Mounting flange 16 features side ribs 22,24 which function to reinforce flange 16 and preclude starting circuit case 10 from vibrating once mounted on fixture support 18. Ribs 22,24 therefore simultaneously prevent mounting flange 16 from snapping off plug assembly 14, and prevent vibration from causing damage to the electronic components located within starting case 10.

Starter section 12 is generally shaped as a rectangular box having an open end 26 (FIG. 4), a closed end 28, a top and bottom 30 and 32 (FIG. 2), respectively, and a pair of side walls 34 and 36. Starter section 12 is formed out of any suitable pliable material such as polyethylene terepthalate, or the like. As can be clearly seen in FIG. 3, side wall 34 of starter section 12 provides an internal surface 38 having a lower rail 40 and an upper rail 42. Lower rail 40 is formed by a substantially horizontal member 44 and a side member 46. Lower rail 40 and upper rail 42, each of which increase in cross-section from open end 26 to closed end 28, together define tapered guide track 48 along the length of internal surface 38. Similarly, side wall 36 is symmetrically defined and includes an internal surface 50, a lower rail 52 formed by horizontal member 54 and side member 56. Wall 36 also includes upper rail 58 which, together with lower rail 52, defines tapered guide track 60 along the length of internal surface 50.

Figure 3:
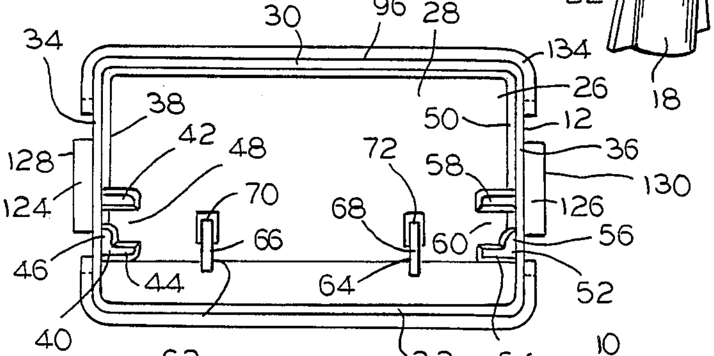
FIG. 3 is a cut-away side elevational view of the present invention taken generally along the line 3—3 of FIG. 2, illustrating the internal structure of the starter section of the starting circuit case of FIG. 1.
Figures 4, 5, 6, 7:
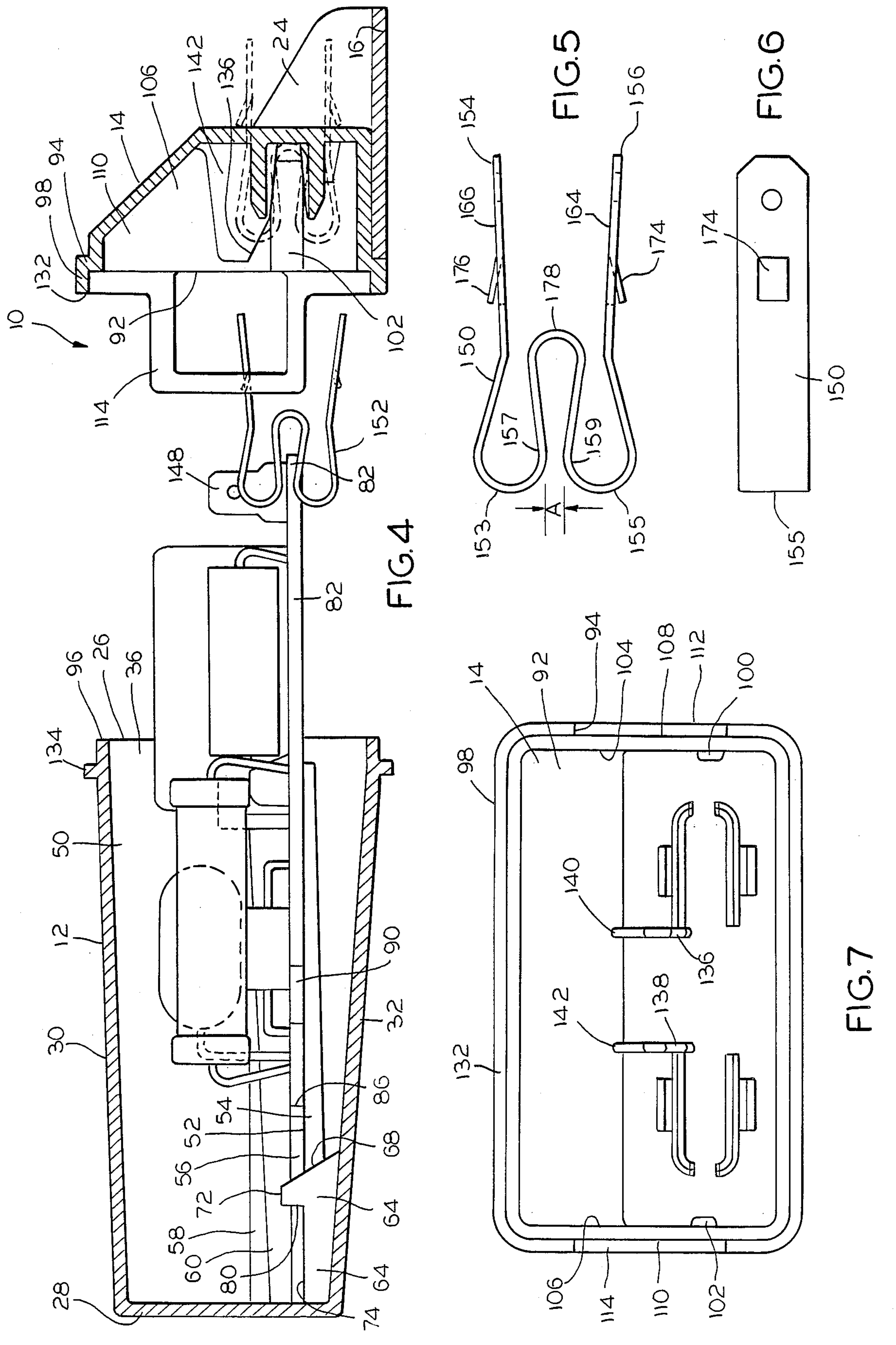
FIG. 4 is an exploded cut-away side elevational view of the starting circuit case of the present invention.
FIG. 5 is a side elevational view of a dual spring terminal forming part of the present invention.
FIG. 6 is a top plan view of the dual spring terminal shown in FIG. 5.
FIG. 7 is a cut-away front elevational view of the internal structure of the cap section of the starter circuit case of the present invention taken generally along line 7—7 of FIG. 2.

Starter section 12 also provides two snap retainers 62,64 which are located towards closed end 28 and are oriented vertically from bottom 32 (FIGS. 3, 4). Snap retainers 62,64 are also oriented generally parallel to side walls 34,36, and are formed by backward and upwardly angled edges 66,68, respectively, which face open end 26. Angled edges 66,68 terminate in short horizontal cap sections 70,72, respectively, which are oriented generally parallel to guide tracks 48,60. Cap sections 70,72 terminate towards closed end 28 and drop down to plateaus 74,76, forming vertically disposed retaining edges 78,80 thereby.

Guide tracks 48,60 are designed to frictionally and removably retain circuit board 82 upon which starter circuit 84 is mounted. A preferred embodiment of starter circuit 84 is disclosed in assignee's U.S. Pat. No. 4,480,214. In assembling starting circuit case 10, circuit board 82 is engaged in guide tracks 48,60 and advanced towards closed end 28. Nearing closed end 28, the taper of rails 40, 42, 52, and 58 widens, narrowing tracks 48,60 and constricting board 82 movement thereby. As insertion of starter circuit 84 into guide tracks 48,60 continues, the leading edge 86 of board 82 encounters angled edges 66,68 of snap retainers 62,64. Bottom 32, upper rails 42,58 and snap retainers 62,64 are slightly flexed and displaced upon continued inertion of board 82, as a result of which leading edge 86 of the board slides over cap sections 70,72 of the snap retainers. Installation of circuit board 82 continues until cap sections 70,72 encounter and engage apertures 88,90 located in board 82, and the board then snaps down under the pressure of the aforementioned displacement of bottom 32, upper rails 42,58 and retainers 62,64. Leading edge 86 of board 82 now squarely rests on plateaus 74,76 of retainers 62,64, and retaining edges 78,80 abut the rims of apertures 88,90, and securely hold board 82 in its installed position.

Figure 2:
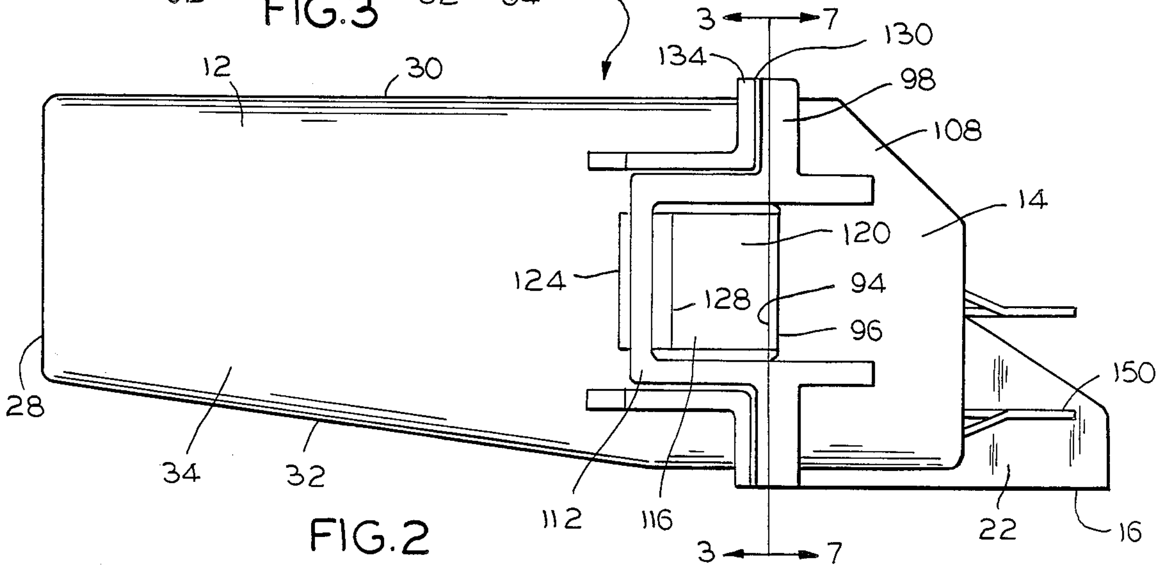
FIG. 2 is a side elevational view of the starting circuit case shown in FIG. 1.

As mentioned previously, starting circuit case 10 also includes cap assembly 14. Cap assembly 14 is formed from any suitable rigid material, such as polycarbonates and the like. Referring to FIGS. 1, 2, and 4, cap assembly 14 includes cap aperture 92 defined by rim 94, which rim is adapted to substantially abut the periphery 96 of open end 26 of starter section 12. Rim 94 is circumscribed at its top, bottom and corners by lip 98, which extends outwardly over periphery 96 and adds rigidity to the assembled case 10. Further rigidity for the cap section as well as vibration damping is provided by wedges 100,102 located on the inside surfaces 104,106 of the cap sides 108,110, respectively (FIGS. 4,7). Wedges 100,102 are vertically located alongside circuit board 82, and are generally coplanar with guide tracks 48,60.

Cap 14 is removably attached to starter section 12 by means of latch elements 112,114, respectively. Latch elements 112,114 cooperate with latch retainers 116,118 on starter section 12 as best seen in FIGS. 1, 2 and 3. Retainers 116,118 each feature a shallow mounting surface 120,122 and a steep removal surface 124,126, thereby forming retaining steps 128,130, respectively. Retaining steps 128,130 preferably protrude outwardly from side walls 34,36 at least as deeply as do latch elements 112,114.

The function of the aforementioned latching mechanisms is as follows: Starter circuit 84 is inserted within starter section 12 as described previously. Starter section 12 is then attached to cap assembly 14 by inserting the periphery 96 of open end 26 of the starter section 12 within lip 98 of cap section 14. Latch elements 112,114 gradually spread open as they ride over shallow mounting surfaces 120,122 of retainers 116,118. As latch elements 112,114 pass over the top of retaining steps 128,130, they encounter steep removal surfaces 124,126. The reverse angle of surfaces 124,126 biases cap assembly 14 towards starter section 12, while simultaneously holding the starter section and the cap section securely together.

Cap section or assembly 14 is pulled towards starter section 12 until the leading edge 132 of lip 98 engages stop 134 (FIGS. 1,4) which occurs simultaneously as periphery 96 of open end 26 abuts rim 94. This two-part abutment significantly increases the rigidity of case assembly 10.

As starter section 12 was being inserted into cap section 14 as described above, downwardly angled faces 136,138 of flanges 140,142 (FIG. 4) were camming trailing edge 144 of circuit board 82 downwardly to locate the circuit board between wedges 100,102 of the cap assembly (FIG. 7). As trailing edge 144 was being guided and placed between wedges 100,102, a pair of spaced contacts 148 (FIG. 4) located at trailing edge 144 of board 82 were automatically inserted within dual spring terminals 150,152 (FIG. 1). Dual spring terminal 150 will be discussed in detail hereinbelow. However, it will be understood that dual spring terminal 152 is identical to dual spring terminal 150, and that the following discussion applies equally.

Dual terminal 150, as shown in detail in FIGS. 5 and 6, is formed of phosphorous bronze or other suitable material. The terminal 150 is spring tempered and preferably tin plated, and is symmetric about a central axis, through which axis circuit board 82 passes when circuit case 10 is fully assembled. In the preferred embodiment, spring 150 is permanently mounted in cap assembly 14 by first squeezing together leaves 154,156 and inserting them into slots 158,160 of cap end wall 162 (FIG. 4), as more fully explained below. In an alternate embodiment, spring 50 may be designed such that it is inserted through slots 158,160 of cap end wall 162 by first spreading leaves 154,156 apart. Supports 168 (FIG. 7) in cap assembly 14 stiffen and locate springs 150 by supporting leaves 154,156. Each support 168 is generally "U"-shaped having an open end 170 and detent 172, each of which are adapted to slidably engage around an edge of circuit board 82. Therefore, end 170 and detent 172 preclude trailing edge 144 of the circuit board from hindering the assembly of circuit case 10. It is also seen how flanges 140,142 (FIG. 7) guide circuit board 82 into open end 170 and detent 172 and therefore, within the portions of springs 150,152 extending between curved ends 153,155.

Each dual spring 150 also includes snap tangs 174,176 which are punched out of the material comprising spring 150 and are bent away from leaves 154,156. Although in the illustrated embodiment, tangs 174,176 protrude outwardly from leaves 164,166, they could equally protrude inwardly.

Each dual spring 150 is assembled within cap portion 14 by spreading tips 154,156 apart or moving the tips together and sliding leaves 164,166 over support 168, which forms part of cap assembly 14. Tips 154,156 are guided into slots 158,160 in end wall 162 of the cap portion and are inserted therethrough. As leaves 164,166 begin to follow tips 154,156 through slots 158,160, snap tangs 174,176 are depressed. As tangs 174,176 completely pass through slots 158,160, they snap open and lock each dual spring 150 in place. Inner bend 178 of dual spring 150 prevents the spring from being further inserted during its assembly into plug 14. Inner bend 178 also prevents spring 150 from further insertion into cap portion 14 when contacts 146 and 148 and circuit board 82 are forced into spring 150 during the assembly of starter portion 12 and cap portion 14 into circuit case 10. Electrical leads 180 extending from the lamp may now be attached to tips 154,156 (FIG. 1).

As curved ends 153,155 of spring 150 curve around towards inner bend 178, they come relatively close together at points 157,159, separated by the distance A. Spring 150 is designed such that the distance A between points 157 and 159 is maintained to ensure constant electrical contact between springs 150,152 and contacts 146 and 148 on circuit board 82 when the circuit board is inserted in the end cap assembly. Therefore, spring 150 is designed to inherently deliver a constant and sufficient spring tension between points 157 and 159 when the spring is in contact with the circuit board, and to provide this spring action through repeated insertions and removals of circuit boards relative to the cap member. Additional tension is provided at points 157,159 as tips 154,156 tend to spread apart, in the preferred embodiment, after the tips are inserted through slots 158,160 of cap end wall 162. As seen in FIG. 5, as tips 154,156 spread outwardly after being compressed together for insertion into the slots of the end cap, the inherent design of spring 150 causes points 157,159 to be forced toward each other under increased pressure to ensure constant electrical contact between springs 150,152 and contacts 146,148 of the circuit board.

Thus it is seen how the structure satisfying the varied requirements and objects of the invention has been provided. Circuit case 10 is comprised of starter section 12 and cap section or assembly 14. By securing electrical lead 180 to tips 154,156 and securing cap assembly 14 to support 18, a permanent "socket" is provided for starter section 12 and the circuit board 82 inside the case. Starter section 12 and the electronics within may be easily and quickly replaced without tools by squeezing walls 34,36 near retainers 62,64. Snap tangs 174,176 and retainer 20 maintain the integrity of the "socket" when starter section 12 is removed, while inner bend 178 of each dual spring 150, 152 and retainer 20 maintain the integrity of the "socket" when starter section 12 is installed. Each of the components within starter section 12 and cap assembly 14 may easily be installed by hand. Additionally, starter section 12 of casing 10 may be reused, if desired, by deforming bottom 32 and retainers 62,64 and simultaneously removing circuit board 82. A new circuit board can be readily installed by inserting the board along guide tracks 48,60 (FIG. 3) until cap sections 70,72 capture apertures 88,90 in the circuit board.

While a preferred embodiment of the present invention has been described and illustrated, further modifications may be made thereto which fall within the spirit and scope of the invention. It is contemplated, therefore, that any such modifications and their equivalents will be covered by the following claims.

What is claimed is:

1. A case for a starting circuit for an electrical lamp having a housing, said case comprising:
- a starter section, said starter section including means for removably containing a starting circuit, said starting circuit including first contact means for forming an electrical connection with said starting circuit;
- a cap assembly secured to said housing of said electrical lamp, said cap assembly including second contact means for forming an electrical connection with said electrical lamp; and latch means located on said starter section and said cap assembly, said latch means on said starter section and said latch means on said cap assembly being capable of engaging each other, thereby joining said starter section to said cap assembly, and thereby forming said case, whereby said first contact means of said starting circuit and said second contact means of said cap assembly engage each other to form an electrical connection between said starting circuit and said electrical lamp.

2. The case for a starting circuit of claim 1 wherein said latch means includes latch elements extending from one of said starter section or said cap assembly, said latch elements being capable of engaging reverse-sloped retainer means on the other of said starter section or said cap assembly, said starter section and said cap assembly being readily manually attachable and separable upon deforming of said latch elements by said retainer means when said starter section is being attached to or separated from said cap assembly.

3. The case for a starting circuit of claim 2 wherein said latch elements extend from said cap assembly, and said retainer means are disposed on a surface of said starter section.

4. The case for a starter circuit of claim 2 wherein one of said starter section and said cap assembly is substantially more flexible than the other.

5. The case for a starter circuit of claim 4 wherein said starter section is more flexible than said cap assembly.

6. The case for a starter circuit of claim 1 wherein said starter section includes at least one pair of parallel and opposing walls, each said wall having an internally facing side, each said internally facing side of each wall including track means extending the length thereof to slidably and removably receive a circuit board upon which said starting circuit is mounted.

7. The case for a starting circuit of claim 6 wherein said starter section further includes retaining means to releasably retain said circuit board in said starter section when said starter section is released from said cap assembly.

8. The case for a starting circuit of claim 7 wherein said retaining means for said circuit board includes tab means extending from an interior wall of said starter section and adapted to protrude through aperture means disposed in said circuit board when said circuit board is received by said starter section.

9. The case for a starting of claim 1 wherein said second contact means in said cap assembly comprise dual spring terminal means capable of slidably engaging said first contact means of said starting circuit in said starter section when said starter section and said starting circuit are latched to said cap assembly.

10. The case for a starting circuit of claim 9 wherein said dual spring means comprises at least one terminal provided by a spring element which is substantially symmetrical about a central axis, said spring element defining a generally U-shaped configuration about said central axis having inner connector leg portions and outer terminal leg portions, said terminal leg portions of said spring element protruding through apertures disposed in a wall of said cap assembly and adapted to be connected to electrical leads from said electrical lamp.

11. The case for a starting circuit of claim 10 wherein said terminal leg portions of said spring element include tang means oriented to allow said terminal leg portions to be extended through said apertures in said cap assembly, and to preclude withdrawal of said terminal leg portions once inserted through said apertures.

12. The case for a starting circuit of claim 1 wherein said second contact means include dual spring means in said cap assembly, said dual spring means capable of slidably engaging and making electrical contact with a circuit board received in said starter section, said circuit board mounting said starting circuit;

said starter section having an open end through which said circuit board is received and shoulder means extending around to outer perimeter of said starter section substantially adjacent said open end of said starter section;

said cap assembly including a lip portion thereof, said lip portion adapted to engage said shoulder means on said starter section when said cap means is secured to said starter section; said latch means, dual spring means in engagement with said circuit board, and said lip means in engagement with said shoulder means combining to hold said starting section securely to said cap assembly.

* * * * *